United States Patent [19]

Everett

[11] 4,320,294

[45] Mar. 16, 1982

[54] CONTROL DEVICE AND METHOD OF MAKING THE SAME

[75] Inventor: Charles J. Everett, Clinton, Conn.

[73] Assignee: Robertshaw Controls Company, Richmond, Va.

[21] Appl. No.: 217,395

[22] Filed: Dec. 17, 1980

Related U.S. Application Data

[62] Division of Ser. No. 76,407, Sep. 17, 1979.

[51] Int. Cl.³ .................. G01D 5/34

[52] U.S. Cl. .................. 250/231 P

[58] Field of Search .................. 250/231 P, 239

[56] References Cited

U.S. PATENT DOCUMENTS 3,989,910 11/1976 Russell et al. .................. 200/83

4,122,337 10/1978 Okuda et al. .................. 250/231

*Primary Examiner*—David C. Nelms

*Assistant Examiner*—Darwin R. Hostetter

*Attorney, Agent, or Firm*—Candor, Candor & Tassone

[57] ABSTRACT

A control device having a housing provided with an actuator chamber separated from a pressure differential chamber by a wall having an opening therethrough receiving an axially movable actuator pin that transmits axial movement of a movable part in the pressure differential chamber to the actuator chamber, the actuator pin being separate from and engageable with the movable part. An optical switch unit is disposed in the actuator chamber and the actuator pin has an interrupter vane for actuating the optical switch unit when the movable part axially moves the actuator pin to a certain axial position relative to the housing. The actuator pin has an orientation arrangement that cooperates with an orientation arrangement of the wall opening to maintain the interrupter vane of the actuator pin in proper rotational alignment with the optical switch unit.

12 Claims, 6 Drawing Figures

CONTROL DEVICE AND METHOD OF MAKING THE SAME

CROSS-REFERENCE TO RELATED APPLICATION

This application is a divisional patent application of its copending parent patent application, Ser. No. 076,407, filed Sept. 17, 1979.

BACKGROUND OF THE INVENTION

1. Field of the Invention

This invention relates to an improved control device of the differential pressure type and to a method of making the same.

2. Prior Art Statement

It is known to provide a control device having a housing means provided with an actuator chamber separated from a pressure differential chamber by wall means having opening means therethrough receiving an axially movable actuator pin that transmits axial movement of a movable part in the pressure differential chamber, the actuator pin being separate from and engageable with the movable part to the actuator chamber.

For example, see the following U.S. Patent:

(1) U.S. Pat. No. 3,989,910—Russell et al.

It appears that the pressure differential control device of item (1) above has the actuator pin thereof operate a lever system for controlling an electrical switch, the range spring that is operatively interconnected to the actuator pin having one end thereof adjustably carried by the cover of the housing means.

It is also known to have an optical switch means interrupter carried by a diaphragm assembly which will move the interrupter relative to the optical switch unit in relation to the position of the diaphragm assembly in the housing means carrying the same.

For example, see the following U.S. Patent:

(2) U.S. Pat. No. 4,122,337—Okuda et al

It appears that in every embodiment of the pressure electrical signal conversion means of item (2) above, the light interrupter plate is fastened to its movable diaphragm assembly so as to move in unison therewith, the interrupter plate being disposed intermediate a photosensitive cell means and a light soure means.

SUMMARY OF THE INVENTION

One feature of this invention is to provide an optical switch means in a control device of the pressure differential type so that the optical switch means will be actuated by the movement of a movable part in the pressure differential chamber of such control device.

For example, it was found according to the teachings of this invention, that the actuator pin of a control device of the pressure differential type can be utilized as the interrupter means for operating an optical switch means.

In particular, one embodiment of this invention provides a control device having a housing means provided with an actuator chamber separated from a pressure differential chamber by wall means having opening means therethrough receiving an axially movable actuator pin that transmits axial movement of a movable part in the pressure differential chamber to the actuator chamber, the actuator pin being separate from and engageable with the movable part. An optical switch means is disposed in the actuator chamber and the actuator pin has interrupter means for actuating the optical switch means when the movable part axially moves the actuator pin to a certain axial position relative to the housing means. The actuator pin has orientation means, the opening means having orientation means cooperating with the orientation means of the actuator pin to maintain the interrupter means of the actuator pin in proper rotational alignment with the optical switch means.

It is another feature of this invention to provide improved range spring means for a control device of the pressure differential type.

For example, it was found according to the teachings of this invention that a unique bridge member can be disposed in the actuator chamber of such a control device so that the range spring can be adjusted thereby before the cover member or housing part is utilized to complete the housing structure as will be apparent hereinafter.

In particular, one embodiment of this invention provides a control device having a housing means provided with an actuator chamber separated from a pressure differential chamber by wall means having opening means therethrough receiving a movable actuator pin that transmits movement of a movable part in the pressure differential chamber to the actuator chamber and is operatively interconnected to one end of an adjustable range spring disposed in the actuator chamber and tending to move the actuator pin in one direction relative to the housing means. A U-shaped bridge member is disposed in the actuator chamber and has a pair of legs straddling the range spring and a cross member adjacent the other end of the range spring, the cross member carrying adjusting means for adjusting the other end of the range spring relative to the housing means.

Accordingly, it is an object of this invention to provide an improved control device having one or more of the novel features of this invention as set forth above or hereinafter shown or described.

Another object of this invention is to provide a method of making such a control device, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
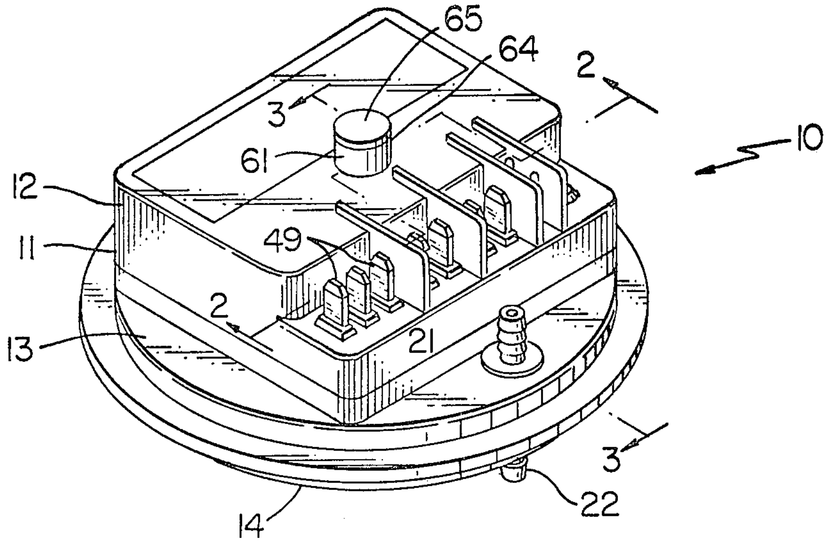
FIG. 1 is a top perspective view of the improved control device of this invention.

While the various features of this invention are hereinafter described and illustrated as being particularly adapted to form a control device of the pressure differential type for controlling the defrost cycle of a heat pump system, it is to be understood that the various features of this invention can be utilized singly or in any combination thereof to provide a control device for other purposes as desired.

Therefore, this invention is not to be limited to only the embodiment illustrated in the drawings, because the drawings are merely utilized to illustrate one of the wide variety of uses of this invention.

Figure 2:
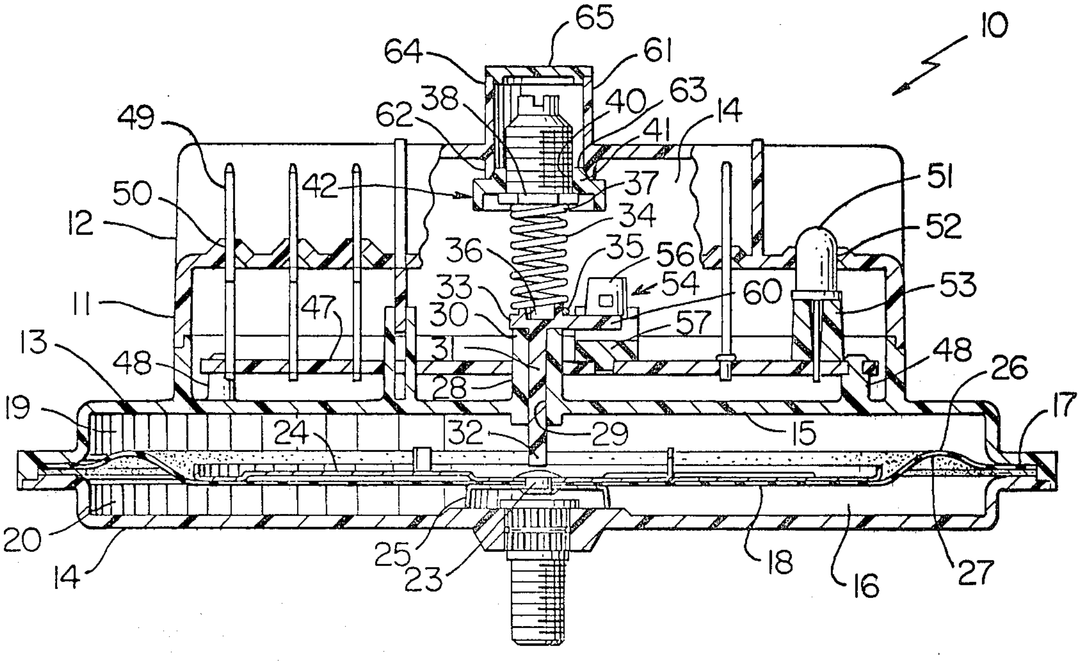
FIG. 2 is an enlarged cross-sectional view taken on line 2—2 of FIG. 1, FIG. 2 being partially broken away.
Figure 3:
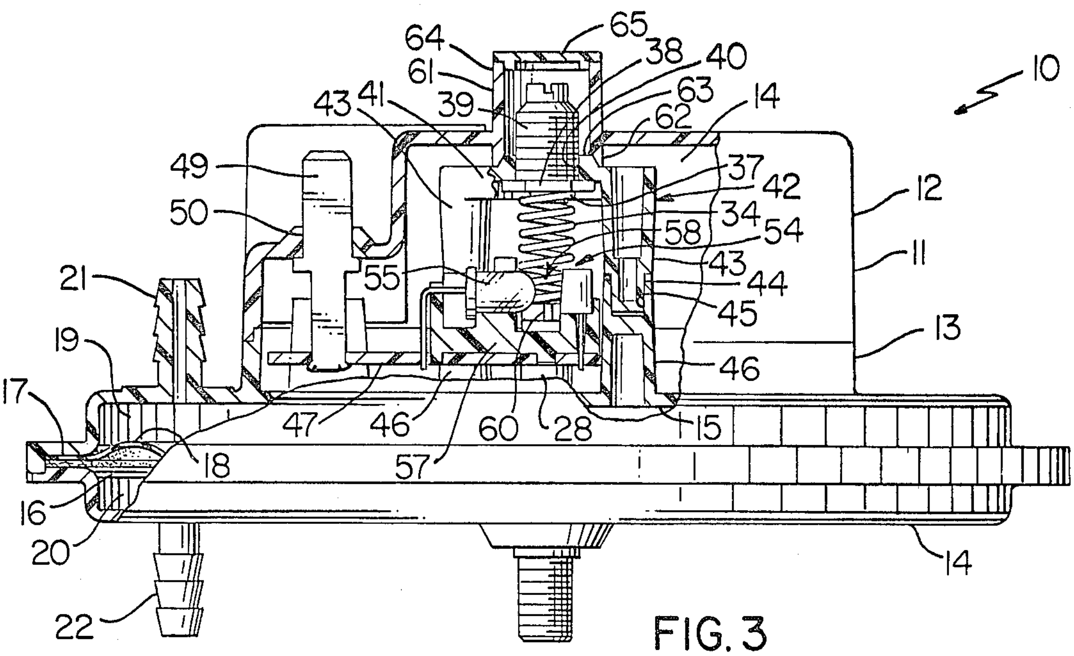
FIG. 3 is an enlarged broken away and partially cross-sectioned view of the control device of FIG. 1 and is taken substantially on line 3—3 of FIG. 1.

Referring now to FIGS. 1–3, the improved control device of this invention is generally indicated by the reference numeral 10 and comprises a housing means 11 formed of three housing parts 12, 13 and 14 shaped in the configuration illustrated in the drawings to cooperate together in forming an actuator chamber 14 on one side of an intermediate wall means 15 and a pressure differential chamber 16 on the other side of the intermediate wall means 15.

While the housing parts 12, 13 and 14 can be formed of any suitable material and can be secured together in any suitable manner, the housing parts 12, 13 and 14 illustrated in the drawings are formed from plastic material and are secured together by adhesive means or by ultrasonic welding in a manner well known in the art.

The housing parts 13 and 14 trap an outer peripheral portion 17 of a flexible diaphragm 18 therebetween so that the flexible diaphragm 18 separates the pressure differential chambers 16 into compartments 19 and 20 which are respectively adapted to receive fluid pressure through nipples 21 and 22 formed integrally with the housing parts 13 and 14 as illustrated in FIG. 3 and in a manner well known in the art.

In this manner, changes in the resulting pressure differential acting across the diaphragm 18 causes an intermediate rivet-like part 23 of the diaphragm 18 to move upwardly or downwardly in the chamber 16 to control means in the actuating chamber 14 in a manner hereinafter set forth, the rivet-like member 23 fastening rigid backing plates 24 and 25 to opposite sides 26 and 27 of the flexible diaphragm 18 in a manner conventional in the art.

The intermediate wall means 15 of housing part 13 has a tubular member 28 formed integral therewith and with an opening means 29 passing completely through the same, the tubular part 28 having a free end 30 disposed in the actuating chamber 14 as illustrated.

An actuating pin 31, also formed of plastic material if desired, is disposed in the opening means 29 of the tubular part 28 so as to have a free end 32 thereof disposed in the pressure differential chamber 16 to be engaged by the movable part 23 so as to transmit movement of the diaphragm 18 to the actuating chamber 14 in a manner hereinafter set forth.

The actuating pin 31 of this invention has an enlarged circular disc-like end 33 adapted to abut against the free end 30 of the tubular part 28 in the manner illustrated in FIG. 2 to limit downward movement of the actuating pin 31 relative to the housing means 11 whereby the movable part 23 of the flexible diaphragm 18 can move further downwardly relative to the free end 32 of the actuating pin 31 as illustrated in FIG. 2 if desired.

Upward movement of the actuating pin 31 from the position illustrated in FIG. 2 is opposed by the adjustable compression force of a range spring 34 which has one end 35 thereof disposed about an upstanding annular spring retainer portion 36 of the enlarged end 33 of the actuating pin 31 whereby the end 35 of the range spring 34 is stabilized and aligned with the actuating pin 31 by the retainer portion 36.

The other end 37 of the range spring 34 is fastened to a plate 38 carried by a threaded adjusting member 39 threaded into a self-threading opening 40 of a cross member 41 of a U-shaped bridge member 42 of this invention that has a pair of legs 43 straddling the range spring 34 in the manner illustrated in FIG. 3 and provided with free ends 44 which are received and secured in openings 45 formed in tubular members 46 that extend upwardly from and formed integrally with the intermediate wall means 15 of the housing part 13 for a purpose hereinafter described.

In this manner, rotation of the adjusting member 39 causes the same to thread in or out of the opening 40 of the cross member 41 of the U-shaped bridge member 42 in a self-locking manner with the opening 40 and thereby adjust the force of the compression spring 44 acting downwardly on the actuating pin 31 since rotation of the range spring 34 during the rotation of adjusting member 39 causes the end 35 of the spring 34 to merely rotate on the spring retainer part 36 of the end 33 of the actuating member 31 as the actuating member 31 will not rotate therewith.

In particular, the opening means 29 of the tubular part 28 of the intermediate wall 15 is provided with an orienting cross-sectional configuration that mates with a like orienting cross-sectional configuration of the actuating pin 31 so that the actuating pin 31 will not rotate in the opening 29 but can move axially therein.

Figure 4:
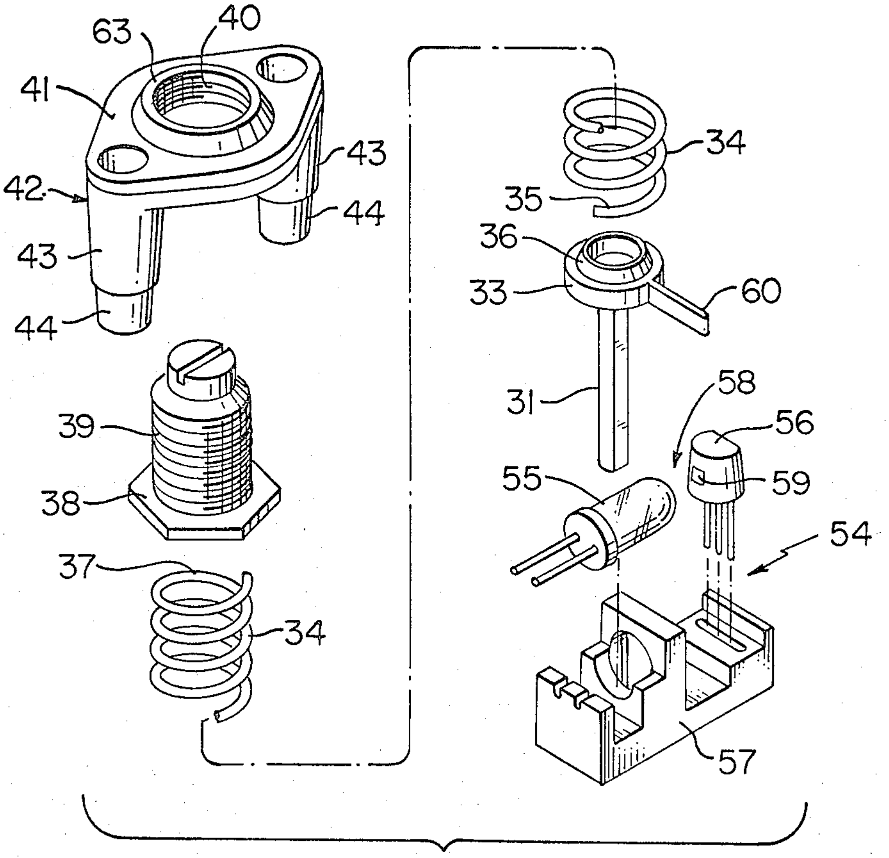
FIG. 4 is an exploded perspective view of certain parts of the control device of FIG. 1.

For example, the cross-sectional configuration of the opening 29 and the cross-sectional configuration of the actuating pin 31 are substantially D-shaped as illustrated in FIG. 4.

A circuit board member 47, also formed of plastic material or any other suitable material, is carried on a plurality of post means 48 formed integrally with the intermediate wall 15 of the housing part 13 as illustrated so as to be disposed in the actuator chamber 14 and carry a plurality of electrical terminals 49 that are adapted to project outwardly through suitable openings 50 in the cover member 12 as illustrated. In addition, the circuit board means 47 is adapted to carry an indicator bulb 51 that projects outwardly through an opening 52 in the cover member 12, the indicator 51 comprising an indicator light supported on a spacer means 53 carried by the circuit board means 47 as illustrated.

Figure 6:
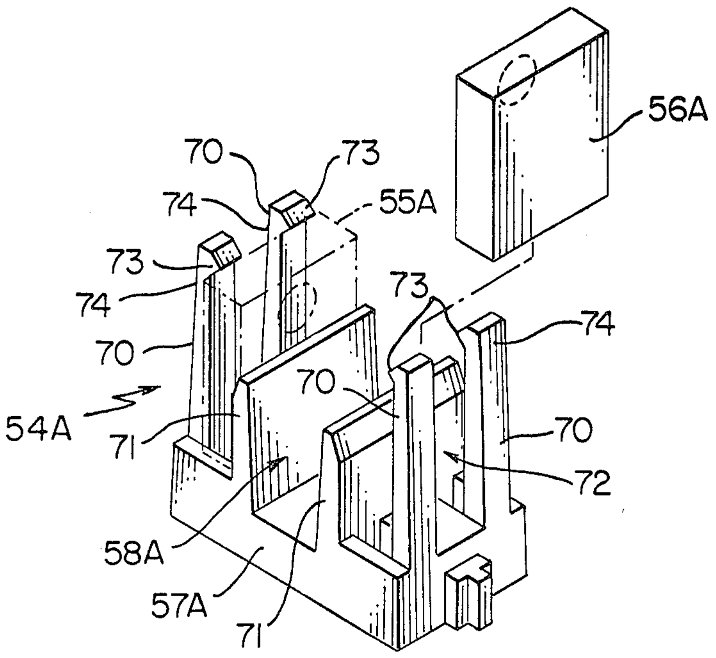
FIG. 6 is an exploded perspective view of the optical switch means of FIG. 5.
Figure 5:
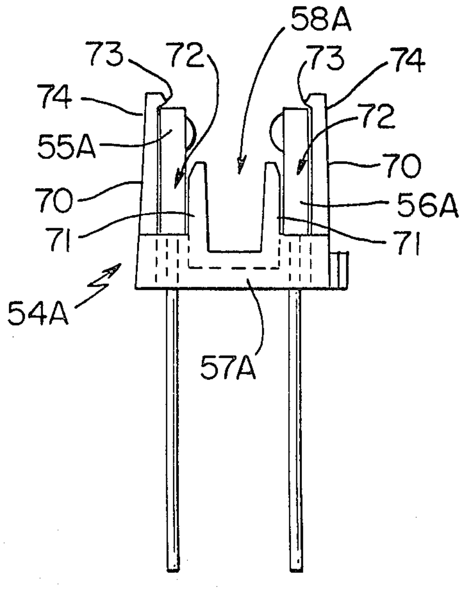
FIG. 5 is a side view of another embodiment of the optical switch means for the control device of this invention.

An optical switch means of this invention is generally indicated by the reference numeral 54 and comprises an electrical light source or bulb 55 and a light beam sensor 56 respectively carried by a cradle member 57 also formed of plastic material or the like and secured to the circuit board means 47 in a suitable manner whereby a space 58 exists between the light source 55 and a window 59 of the sensor 56 when the same are assembled in the cradle 57 as illustrated in FIG. 3. A present preferred embodiment of the optical switch means 54 of this invention is illustrated in FIGS. 5 and 6 and will later be described in detail.

The actuator pin 31 of this invention is provided with an integral outwardly extending interrupter means or vane 60 that is disposed substantially transversely to the actuator pin 31 and is integrally interconnected to the large disc end 33 thereof so as to be positioned in the space 58 between the light source 55 and the sensor window 59 whereby the vane 60 will interrupt the light beam from the light source 55 being sensed at the window 59 of the sensor 56 to cause the switch means 54 to operate any suitable device when the vane 60 is positioned adjacent the window 59 by the diaphragm 18 having been moved upwardly to a certain position relative to the housing means 11 in opposition to the force of the range spring 34.

As previously stated, the actuator pin 31 and, thus, the vane 60 cannot rotate in the opening 29 of the tubular member 28 so that vane 60 is always disposed in the space 58 between the light source 55 and the sensor 56.

While the optical switch means 54 of this invention can be utilized to control any desired circuit means upon having the vane 60 interrupt the beam flow to the window 59 of the sensor 56 in the manner previously described, one such circuit arrangement comprises the invention disclosed and claimed in the copending patent application, Ser. No. 066,349, filed Aug. 13, 1979. Thus, it can be seen that the control device 10 of this invention can be utilized to operate desired electrical structure, such as in connection with the defrost cycle of a heat pump system or the like, each time the vane 60 crosses in front of the window 59 of the sensor 56 to prevent the beam of light from the light source 55 from reaching the window 59.

During the making of the control device 10 according to the method of this invention, the U-shaped bridge member 42 is secured to the tubular members 46 of the intermediate wall 48 before the cover member 11 is secured in place so that the adjusting member 39 can be adjusted to test the range spring 34 of the device 10 to make sure that the range spring 34 is operating correctly and, in fact, is the proper rated spring for the particular control device 10 being made, as it is relatively easy to replace the spring 34 at this stage in the making of the control device 10.

Thereafter, once it has been determined that the range spring 34 is correct and can be adjusted correctly, the cover member 12 is secured in place whereby a central tubular section 61 thereof has a lower end 62 telescoped against an upstanding part 63 of the cross member 41 of the U-shaped bridge member 42 as illustrated with the upper end 64 thereof providing access means to the adjusting member 39 so that the member 39 can be subsequently adjusted in the field or the like. The open end 64 of the tubular section 61 of the cover member 12 is closed by a suitable removable closure 65 as illustrated.

Therefore, it can be seen that the control device 10 of this invention can be formed from relatively few parts in a simple manner by the method of this invention to operate in a manner now to be described.

With the control device 10 having the nipples 21 and 22 thereof respectively interconnected to the desired pressure fluid pressure sources and with the optical switch means 54 being electrically interconnected to the desired electrically operated mechanism so that the mechanism will operate under one condition as long as the light source 55 is being sensed at window 59 by the sensor 56 and will be changed to another operating condition thereof when the beam of light to the window 59 is interrupted by the vane 60 of the actuating pin 31, it can be seen that as long as the pressure differential acting across the flexible diaphragm 18 is such that the force of the compression spring 34 maintains the enlarged head 33 of the actuating pin 31 against the free end 30 of the tubular member 28 of the intermediate wall 51, the vane 60 is out of the path of light beam being sent from the light source 55 to the window 59 of the sensor 56 of the optical switch means 54 in the manner illustrated in FIGS. 2 and 3.

However, when the pressure differential acting across the diaphragm is sufficient to cause the diaphragm 18 to move upwardly in opposition to the force of the compression spring 34 by the part 23 of the diaphragm 18 acting against the end 32 of the actuator pin 31 to move the same upwardly in FIG. 2, the vane 60 will move upwardly therewith and when the vane 60 reaches the position thereof that causes the vane 60 to interrupt the light beam from the lamp 55 from reaching the window 59 of the sensor 56, the sensor 56 will cause the desired electrically operating mechanism to function in a different manner, such as by providing a defrost cycle of a heat pump system or the like.

Thereafter, should the pressure differential across the diaphragm 18 change so that the actuating pin 31 moves downwardly under the force of the spring 34 and thereby again exposes the window 59 to the light source 55, the optical switch means 54 would provide a different operating function of such electrically operated mechanism.

Therefore, it can be seen that the control device 10 can be adjusted by the adjusting means 39 to change the force of the range spring 34 and thereby change the force of the pressure differential that is required to act on the diaphragm 18 to cause the vane 60 of the actuating pin 31 to interrupt the light beam being sent from the light source 55 to the window 59 of the sensor 56 for any desired purpose.

As previously stated, a present preferred embodiment of the optical switch means 54 of this invention is generally indicated by the reference numeral 54A in FIG. 5 and parts thereof similar to the optical switch means 54 previously described are indicated by like reference numerals followed by the reference letter "A".

As illustrated in FIGS. 5 and 6, the optical switch means 54A includes a cradle-like member 57A formed of plastic material or the like and being adapted to be secured to the previously described circuit board means 47 of the control device 10 in any suitable manner so that the vane 60 of the actuator pin 31 can move in the space 58A of the cradle member 57A for the reasons previously set forth to interrupt a light beam from a light source means 55A that is being directed to a light source sensing means 56A.

The cradle-like member 57A is so constructed and arranged that the same has a plurality of spaced-apart fingers 70 cooperating with wall means 71 of the cradle-like member 57A to define areas 72 therebetween to respectively receive the light source mans 55A and the sensing means 56A which are shaped in a substantially rectangular configuration as illustrated.

The legs 70 of the crandle member 57A are provided with projections 73 on the free ends 74 thereof so as to snap-fit the light source means 55A and sensing means 56A into the areas 72 as illustrated in FIG. 5 to detachably hold the light source means 55A and sensing means 56A in place.

Thus, it can be seen that the optical switch means 54A of FIGS. 5 and 6 will operate in the control deivce 10 in the same manner as the optical switch means 54 previously described so that a further discussion of the operation thereof is not necessary.

Accordingly, it can be seen that this invention not only provides an improved control device of the pressure differential type, but also this invention provides an improved method of making such a control device or the like.

While the forms and methods of this invention now preferred have been illustrated and described as required by the Patent Statute, it is to be understood that other forms and method steps can be utilized and still fall within the scope of the appended claims.

What is claimed is:

1. In a control device having a housing means provided with an actuator chamber separated from a pressure differential chamber by wall means having opening means therethrough receiving a movable actuator pin that transmits movement of a movable part in said pressure differential chamber to said actuator chamber and is operatively interconnected to one end of an adjustable range spring disposed in said actuator chamber and tending to move said actuator pin in one direction relative to said housing means, the improvement comprising a U-shaped bridge member disposed in said actuator chamber and haivng a pair of legs straddling said range spring and a cross member adjacent the other end of said range spring, said bridge member being separate from said housing means and being completely confined within said actuator chamber, said cross member carrying adjusting means for adjusting said other end of said range spring relative to said housing means.

2. A control device as set forth in claim 1 wherein said legs of said U-shaped bridge member have free ends respectively secured to said wall means.

3. A control device as set forth in claim 2 wherein said wall means has a pair of tubular members respectively receiving said free ends of said legs of said U-shaped bridge member therein.

4. A control device as set forth in claim 1 wherein said housing means has a cover member disposed over said U-shaped bridge member to enclose the same in said actuator chamber.

5. A control device as set forth in claim 4 wherein said cover has access means aligned with said adjusting means of said U-shaped bridge member.

6. In a method of making a control device having a housing means provided with an actuator chamber separated from a pressure differential chamber by wall means having opening means therethrough receiving a movable actuator pin that transmits movement of a movable part in said pressure differential chamber to said actuator chamber and is operatively interconnected to one end of an adjustable range spring disposed in said actuator chamber and tending to move said actuator pin in one direction relative to said housing means, the improvement comprising the steps of disposing a U-shaped bridge member in said actuator chamber in a manner to have a pair of legs straddling said range spring and a cross member adjacent the other end of said range spring, forming said bridge member to be separate from said housing means and be completely confined within said actuator chamber, and forming said cross member to carry adjusting means for adjusting said other end of said range spring relative to said housing means.

7. A method of making a control device as set forth in claim 6 and including the step of securing the free ends of said legs of said U-shaped bridge to said wall means.

8. A method of making a control device as set forth in claim 7 and including the step of forming said wall means with a pair of tubular members that respectively receive said free ends of said legs of said U-shaped bridge member therein.

9. A method of making a control device as set forth in claim 6 and including the step of forming said housing means with a cover member that is disposed over said U-shaped bridge member to enclose the same in said actuator chamber.

10. A method of making a control device as set forth in claim 9 and including the step of forming said cover with access means aligned with said adjusting means of said U-shaped bridge member.

11. A control device as set forth in claim 5 wherein said access means of said cover member comprises a tubular section, said cross member of said bridge member having an upstanding part telescoped within said tubular section of said cover member.

12. A method of making a control device as set forth in claim 10 and including the steps of forming said access means of said cover member as a tubular section thereof, forming an upstanding part in said cross member of said bridge member, and telescoping said upstanding part of said cross member in said tubular section of said cover member.

* * * * *